United States Patent
Cheng et al.

(10) Patent No.: US 8,350,949 B2
(45) Date of Patent: Jan. 8, 2013

(54) METHOD FOR TRANSMITTING MAN-MACHINE OPERATION PICTURE, MOBILE VIDEO DEVICE THEREOF, AND VIDEO SYSTEM USING THE SAME

(75) Inventors: Yung-Ping Cheng, Shanghai (CN); Huafeng Mai, Shanghai (CN); Tony Tsai, Taipei County (TW)

(73) Assignee: Inventec Appliances Corp., Taipei (TW)

( * ) Notice: Subject to any disclaimer, the term of this patent is extended or adjusted under 35 U.S.C. 154(b) by 569 days.

(21) Appl. No.: 12/544,676

(22) Filed: Aug. 20, 2009

(65) Prior Publication Data
US 2010/0165192 A1 Jul. 1, 2010

(30) Foreign Application Priority Data
Dec. 31, 2008 (TW) ................................ 97151609 A

(51) Int. Cl.
*H04N 5/222* (2006.01)
(52) U.S. Cl. ............ 348/333.11; 348/333.12; 455/556.1
(58) Field of Classification Search .. 348/211.99–211.3, 348/333.01–333.12; 455/556.1
See application file for complete search history.

(56) References Cited

U.S. PATENT DOCUMENTS

| | | | | |
|---|---|---|---|---|
| 7,844,296 B2 * | 11/2010 | Yuki | ........................... | 455/556.1 |
| 2003/0236769 A1 * | 12/2003 | Pyhalammi | ....................... | 707/1 |
| 2011/0264657 A1 * | 10/2011 | Hoffman et al. | .............. | 707/728 |

* cited by examiner

*Primary Examiner* — Tuan Ho
(74) *Attorney, Agent, or Firm* — Muncy, Geissler, Olds & Lowe, PLLC

(57) ABSTRACT

A method for transmitting a man-machine operation picture, a mobile video device thereof, and a video system using the same are provided, which are applicable to a first mobile video device and a second mobile video device wirelessly connected to each other, and the first mobile video device includes a first screen. A display picture data is obtained from a video buffer of the first screen. The first screen displays a first picture according to the display picture data. The first mobile video device converts the display picture data into a video data compliant to a video format, and transfers the video data to the second mobile video device according to a video communication protocol. The second mobile video device displays a second picture according to the received video data, and a displaying content of the second picture substantially includes a displaying content of the first picture.

27 Claims, 12 Drawing Sheets

METHOD FOR TRANSMITTING MAN-MACHINE OPERATION PICTURE, MOBILE VIDEO DEVICE THEREOF, AND VIDEO SYSTEM USING THE SAME

CROSS-REFERENCE TO RELATED APPLICATION

This application claims the benefit of Taiwan Patent Application No. 097151609, filed on Dec. 31, 2008, which is hereby incorporated by reference for all purposes as if fully set forth herein.

BACKGROUND OF THE INVENTION

1. Field of Invention

The present invention relates to a method for transferring a video image, and more particularly to a method for transmitting a man-machine operation picture, a mobile video device thereof, and a video system using the same, which are applicable for transmitting a displaying content of a man-machine operation picture of a first mobile video device to that of a second mobile video device by a video conversation.

2. Related Art

In the prior art, when transmitting a video data, a mobile video device obtains an image, and retrieves an image to acquire more than one frame data.

The image, for example, is the picture provided by using a shooting module disposed in the mobile video device, or is the picture provided by reading the image file stored by the mobile video device in advance. The shooting module disposed in the mobile video device includes a low-magnification image-pickup lens, applicable for taking a picture of a user of the mobile video device, and a high-magnification image-pickup lens, applicable for shooting an outdoor scene to produce a picture.

A processor of the mobile video device periodically retrieves an image file or shoots an image to generate the frame data described above. The processor compresses the frame data into a video data according to a video format of, for example, H.263, H.264 or MPEG-4 format.

The mobile video device transfers the video data to a mobile video device as an opposite party in a conversation through a video communication protocol (such as H.223) to complete the vide data transmission. When transmitting the video data, the mobile video device may transmit the voices collected by a microphone of the mobile video device to the mobile video device as the opposite party in the conversation as well.

FIG. 1A is a schematic view of a video conversation in the prior art. Referring to FIG. 1A, a first user has a first mobile video device 1, and a second user has a second mobile video device 2. The first mobile video device 1 and the second mobile video device 2 transfer a video data, together with voices made by the first user and the second user respectively, between each other via a video communication protocol, thereby providing the first user and the second user with a video conversation with image and voice communications.

FIG. 1B is a schematic view of a scenario for the user in any party to provide an information in the prior art. Referring to FIG. 1B, when the first mobile video device 1 stores a data (such as a phone number of a friend) needed by the second user, the first user needs to activate a function module in the first mobile video device 1 that can view the phone number of the friend and informs the second user about the data of the phone number orally.

Alternatively, if the first mobile video device 1 and the second mobile video device 2 are mobile video devices of the same type or have the same or similar function modules, when the first user intends to instruct the second user about skills of using the function modules, he/she can only teach the skills of using the function module to the second user orally, and the second user can only learn to use the function module according to oral statements of the first user.

SUMMARY OF THE INVENTION

Accordingly, the problem to be solved by the present invention is directed to a method for transmitting a man-machine operation picture, a mobile video device thereof, and a video system using the same, which are capable of transmitting a displaying content of an operation picture to an opposite party in a conversation.

In order to solve the method problem described above, the technical means provided by the present invention is to provide a method for transmitting a man-machine operation picture in a video system, which is applicable to a first mobile video device and a second mobile video device wirelessly connected to each other. The first mobile video device includes a first screen. A display picture data is obtained from a video buffer of the first screen, and then converted into a video data compliant to a video format. Then, the video data is transmitted to the second mobile video device according to a video communication protocol.

In order to solve the device problem described above, the technical means provided by the present invention is to provide a mobile video device capable of transmitting a man-machine operation picture, which includes a first screen, a processor, a data composition module, and a wireless module.

The first screen includes a video buffer, and the video buffer stores a display picture data. The processor is used to obtain the display picture data from the video buffer and then convert the display picture data into a video data compliant to a video format. The data composition module is used to obtain the video data provided by the processor and then convert the video data into a binary data stream according to a video communication protocol. The wireless module transmits the binary data stream to at least another mobile video device.

In order to solve the system problem described above, the technical means provided by the present invention is to provide a video system capable of transmitting a man-machine operation picture, which includes a first mobile video device and a second mobile video device.

The first mobile video device includes a first screen, a first processor, a data composition module, and a first wireless module. The first screen includes a video buffer. The video buffer stores a display picture data. The first screen displays a first picture according to the display picture data. The first processor obtains the display picture data periodically, and converts the display picture data into a video data compliant to the video format. The data composition module converts the video data generated at the first processor into a binary data stream according to a video communication protocol. The first wireless module outputs the binary data stream to the second mobile video device.

The second mobile video device includes a second wireless module, a data decomposition module, a second processor, and a second screen. The second wireless module receives the binary data stream. The data decomposition module is used for converting the binary data stream received by the second wireless module back into the above video data according the video communication protocol. The second processor is used for obtaining the display picture data included in the video data generated after a converting process of the data decomposition module. The second screen is sued for displaying a second picture according to the display picture data obtained by the second processor, and the content of the second picture substantially includes the content of the first picture.

The present invention achieves at least the following efficacies.

First, when two mobile video devices are in a video conversation, a first mobile video device capable of transmitting a displaying content of a picture can transmit a displaying content of a man-machine operation picture to a second mobile video device, so as to prevent a user of the second mobile video device from recording data incorrectly due to unclear voices of the user of the first mobile video device, misunderstanding the meaning conveyed by the user of the first mobile video device, or an oral mistake made by the user of the first mobile video device.

Second, when the two mobile video devices are of the same type or have same or similar function modules, the user of the first mobile video device can transmit the displaying content of the man-machine operation picture of the first mobile video device to the second mobile video device. The user of the second mobile video device can get to know how to use the function module precisely and quickly.

When the second mobile video device is capable of transmitting the man-machine operation picture, the user of the second mobile video device can transmit a displaying content of a function module operation picture back to the first mobile video device. Thus, the user of the first mobile video device is enabled to get to know a learning status of the user of the second mobile video device.

Third, when the user of the first mobile video device intends to share a data with the user of the second mobile video device immediately, the user of the first mobile video device simply uses the first mobile video device to open and display the data, and transmits a displaying content of a picture of the first mobile video device to the second mobile video device, the user of the second mobile video device can read the data that the user of the first mobile video device intends to share through the second mobile video device.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

To make the objectives, construction features, and functions of the present invention more comprehensible, the present invention is described below in detail with reference to the embodiments and accompanying drawings.

Figure 1A:
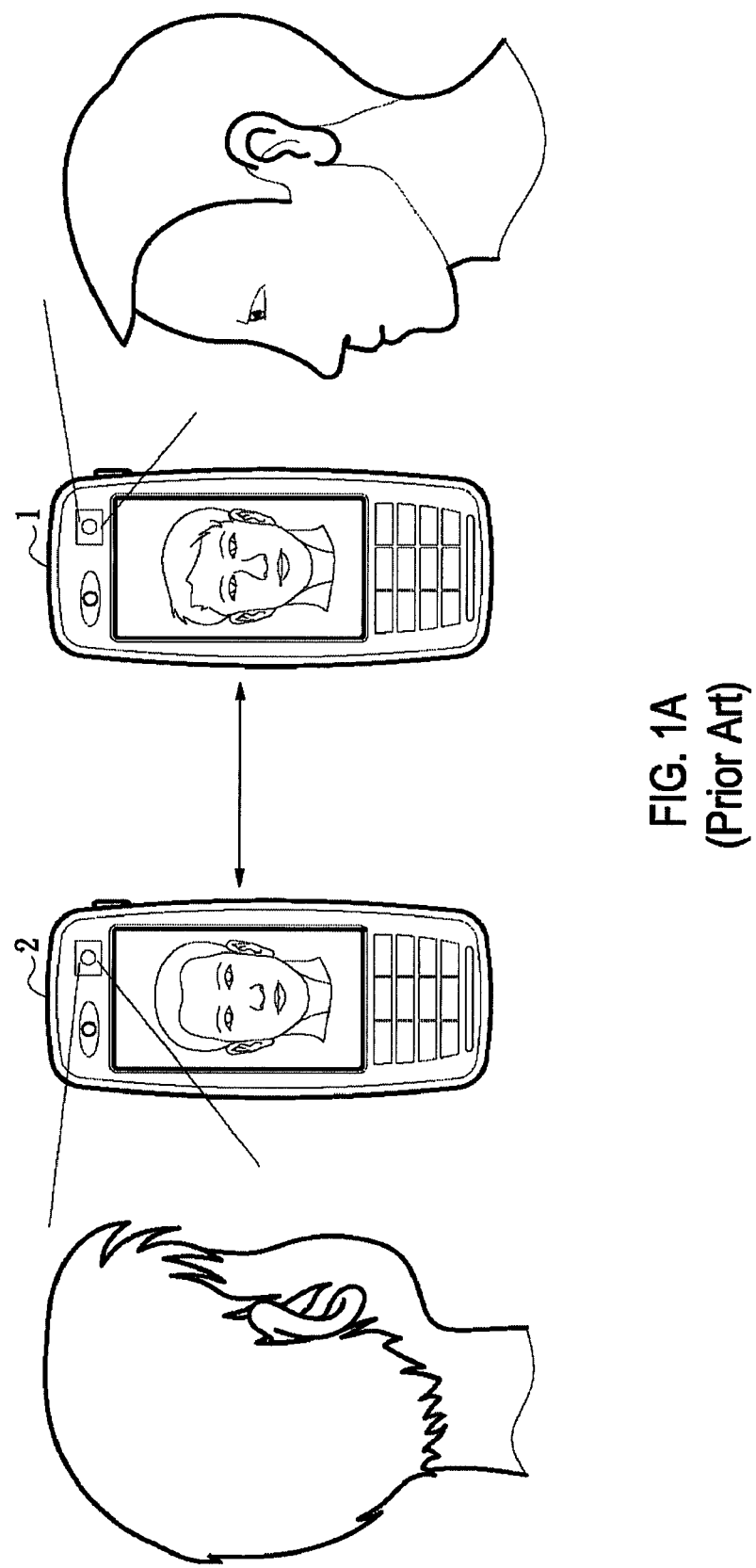
FIG. 1A is a schematic view of a video conversation in the prior art.
Figure 1B:
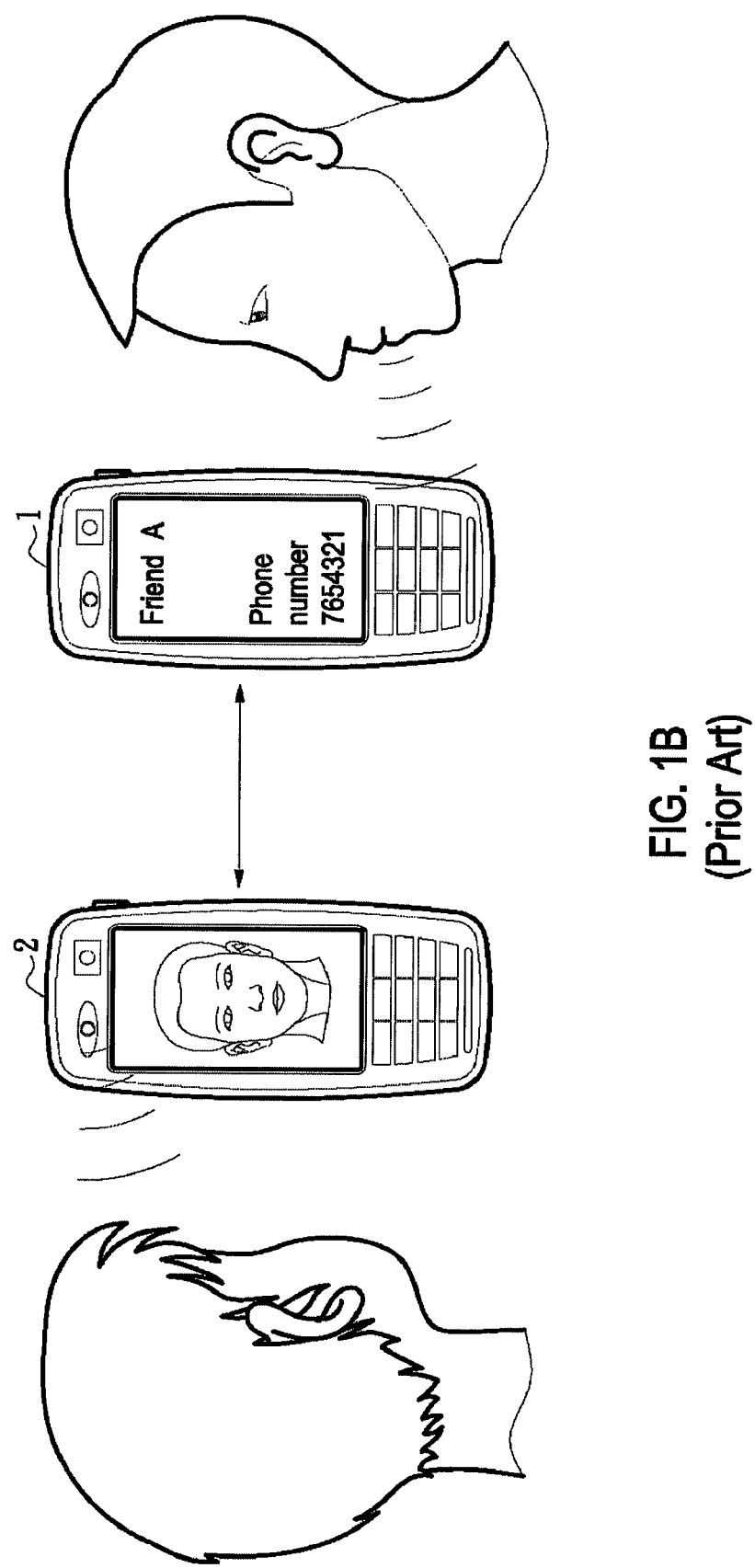
FIG. 1B is a schematic view of a scenario for a user in any party to provide an information in the prior art.
Figure 2:
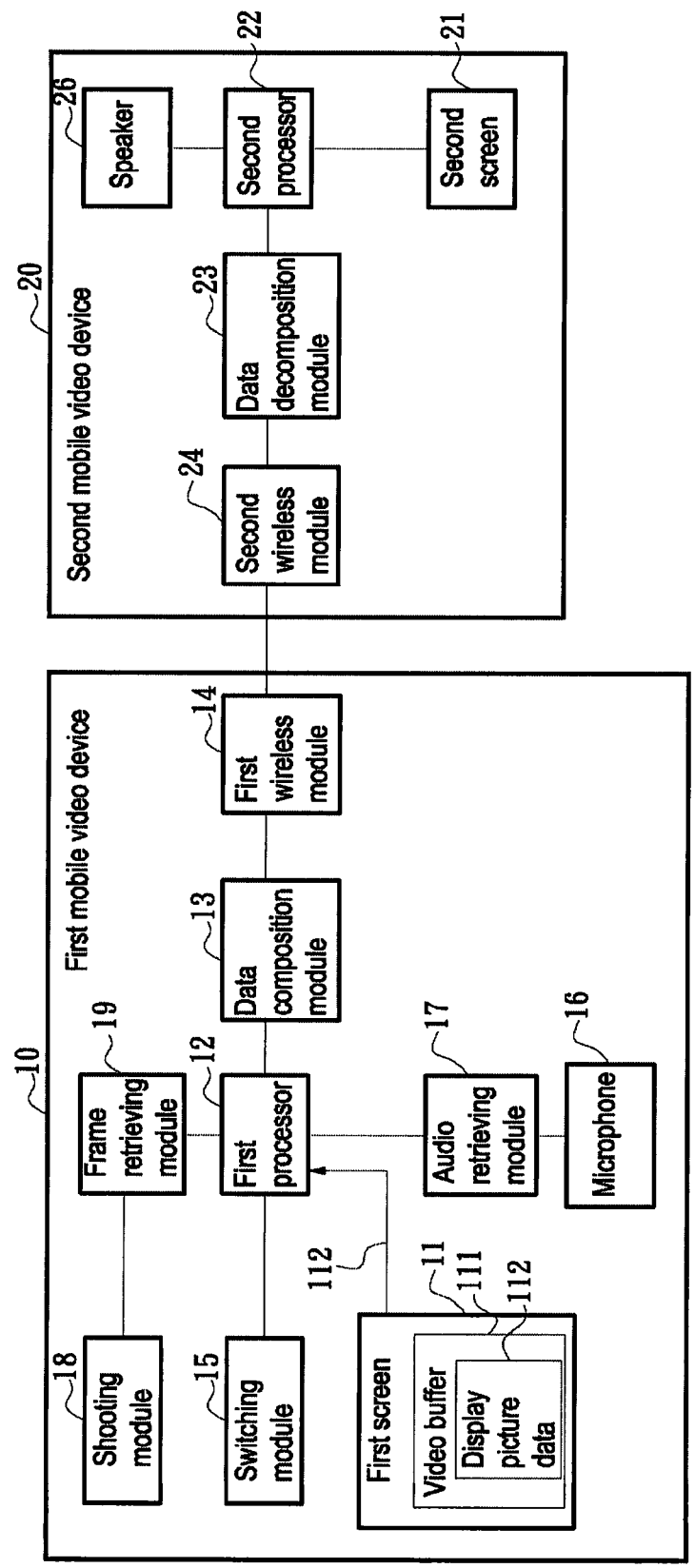
FIG. 2 shows an example of a schematic block diagram of a video system according to an embodiment of the present invention.

FIG. 2 shows an example of a schematic block diagram of a video system according to an embodiment of the present invention. Referring to FIG. 2, the video system includes two mobile video devices. The two mobile video systems may be the same or different in construction, but at least one of them can transmit a displaying content of a man-machine operation picture. In this example, the mobile video device capable of transmitting a displaying content of a man-machine operation picture is considered as a first mobile video device 10, and the other mobile video device that receives the displaying content of the man-machine operation picture is considered as a second mobile video device 20. In other words, the second mobile video device 20 (the other mobile video device) may be a mobile video device that does not have a technique disclosed in the present invention.

As shown in FIG. 2, the first mobile video device 10 includes a switching module 15, a shooting module 18, a frame retrieving module 19, a first processor 12, a first screen 11, a microphone 16, an audio retrieving module 17, a data composition module 13, and a first wireless module 14. The first screen 11 includes a video buffer 111. The second mobile video device 20 includes a second wireless module 24, a data decomposition module 23, a second processor 22, a speaker 26, and a second screen 21. For better understanding, referring to FIGS. 3A, 3B, 3C and 3D, FIG. 3A is a flow chart of a method for transmitting a man-machine operation picture according to a first embodiment of the present invention, which includes the following steps.

First, a display picture data 112 is obtained from a video buffer 111 of the first screen 11 (Step S110).

It should be noted here that, in a common video operation mode, the shooting module 18 of the first mobile video device 10 shoots an image continuously, and the frame retrieving module 19 retrieves the image periodically to generate more than one frame data. The first processor 12 converts the frame data into a video data compliant to a video format.

The microphone 16 of the first mobile video module 10 is used to receive an external voice, and the video retrieving module 17 retrieves the voice periodically to generate more than one voice data. The first processor 12 converts the voice data into an audio data according to a voice source converting format, for example, a wideband-adaptive multi-rate (WB-AMR) format, or a narrowband-adaptive multi-rate (NB-AMR) format. The first processor 12 respectively partitions the audio data and the video data into a plurality of partitioned data, and transfers the partitioned data to the data composition module 13. The data composition module 13 continuously converts the received partitioned data into a binary data stream (such as streaming media) according to a video communication protocol. The first wireless module 14 transfers the binary data stream to the second wireless module 24. The data decomposition module 23 of the second mobile video device 20 recovers the binary data stream received by the second wireless module 24 to the video data and the audio data. The second processor 22 obtains the frame data included in the video data and the voice data included in the audio data from the video data and the audio data respectively. The second screen 21 displays a picture according to the frame data obtained by the second processor 22, in which the picture displayed on the second screen 21 substantially includes a content of the image shot by the first mobile video device 10. The speaker 26 of the second mobile video device 20 is used to play the voice data obtained by the second processor 22.

When the user intends to provide an operation picture of the first mobile video device 10 to the second mobile video device 20, the user uses the switching module 15 to switch a source data obtained by the first processor 12. The configuring mode of the switching module 15 may be similar to setting a switching key 151 (the switching key 151 as shown in FIGS. 4A, 4B, 6A, 6B, and 6C) on the first mobile video device 10.

When the user presses the switching key 151, the first processor 12 stops (or temporarily stops) obtaining the frame data retrieved by the frame retrieving module 19 immediately. Instead, the first processor 12 obtains a display picture data 112 stored in the video buffer 111 of the first screen 11 periodically. The display picture data 112 is provided for being read by the first screen 11, so as to display a first picture, and the first picture is the operation picture of the first mobile video device 10 when being used by the user.

The frequency for the first processor 12 to read the display picture data is substantially equal to the frequency for the frame retrieving module 19 to retrieve the image shot by the shooting module 18.

Figure 3A:
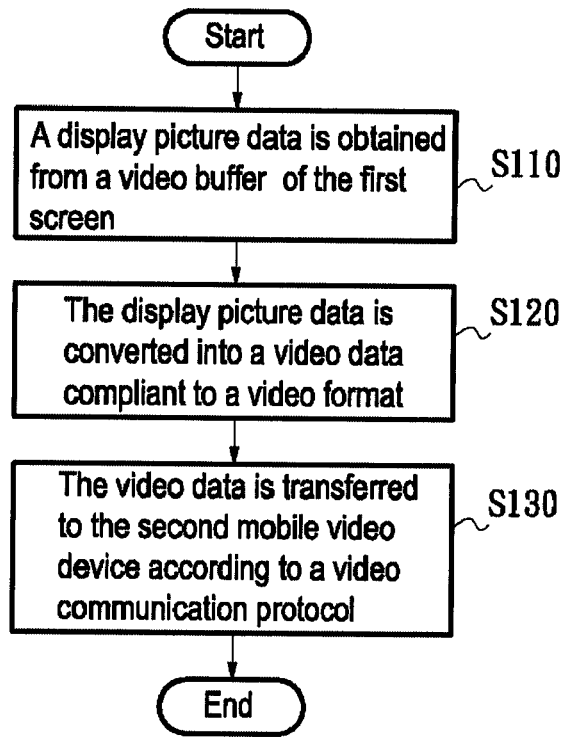
FIG. 3A is a flow chart of a method for transmitting a man-machine operation picture according to a first embodiment of the present invention.
Figure 3B:
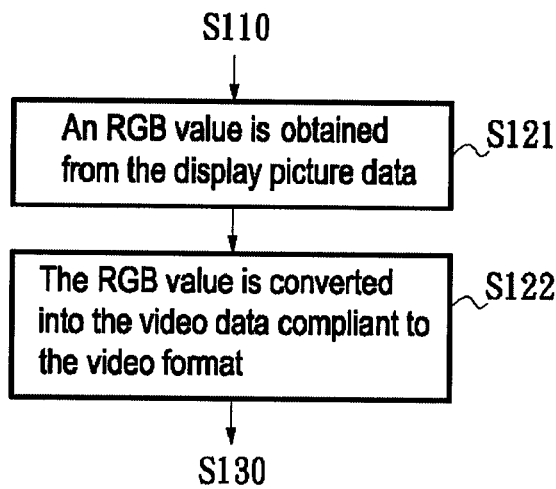
FIG. 3B is an example of the detail flow chart for implementing Step S120 shown in FIG. 3A according to the present invention.
Figure 3C:
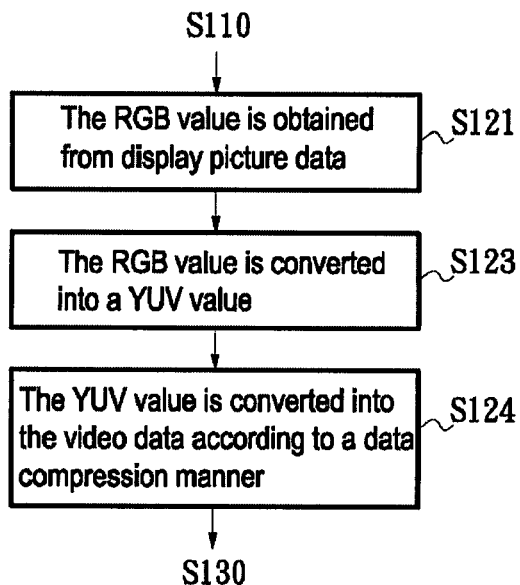
FIG. 3C is an example of the detail flow chart for implementing Step S120 shown in FIG. 3A according to the present invention.

Next, the display picture data is converted into a video data compliant to a video format (Step S120). FIG. 3B is an example of the detail flow chart for implementing Step S120 shown in FIG. 3A according to the present invention, and FIG. 3C is another example of the detail flow chart for implementing Step S120 shown in FIG. 3A according to the present invention. The implementation of Step S120 is illustrated below.

Referring to FIG. 3B, the first processor 12 retrieves a three primary color (RGB) value from the display picture data according to a color display specification of the first mobile video device 10 (Step S121).

For example, the data format of the RGB value includes 16 bits (2 bytes) and 24 bits (3 bytes), and the RGB value includes a red color value, a green color value, and a blue color value.

When the data format of the RGB value includes 16 bits, the red color value takes 5 bits of the RGB value, the green color value takes 6 bits of the RGB value, and the blue color value takes 5 bits of the RGB value. When the data format of the RGB value includes 24 bits, the red color value, the green color value, and the blue color value take 8 bits of the RGB value respectively.

Then, the first processor 10 converts the RGB value into the video data compliant to the video format described above according to a data compression manner (Step S122). The video format is a H.263 format, a H.264 format, a MPEG format, a MPEG-2 format, or a MPEG-4 format.

Referring to FIG. 3C, if the color display specification adopted by the second mobile video module 20 is an European specification, after obtaining the RGB value from the display picture data (Step S121), the first processor 12 converts the RGB value into a YUV value of the European specification (Step S123).

The first processor 12 converts the YUV value into a video data compliant to the video format (such as H.263, H.264, MPEG, MPEG-2 or MPEG-4 image compression manner) according to the above data compression manner (Step S124).

In order to reduce the data volume of the video data, after obtaining the RGB value from the display picture data (i.e., completing Step S121), the first processor 12 further converts a chromaticity of the RGB value, so as to perform a color gray processing on the RGB value. The color gray processing may be performed through a chromaticity and brightness conversion formula as follows (but the conversion formula applied to the color gray processing is not limited hereby, and this embodiment is only intended for demonstration by taking a gray processing conversion formula as an example):

$Y=0.30*R+0.59*G+0.11*B$. The brightness value Y of each pixel in the picture is calculated respectively. Then, the first processor 12 sets up a new 256-color dot matrix according to the RGB value and the brightness values Y. When setting up the dot matrix, it is set as $R=G=B=Y$. Thus, a gray-level image with a color gray level of 256 is obtained. The first processor 12 converts the gray-level image into a video data according to video format. The data volume of the video data is smaller than that of the video data generated by the original RGB value.

Figure 3D:
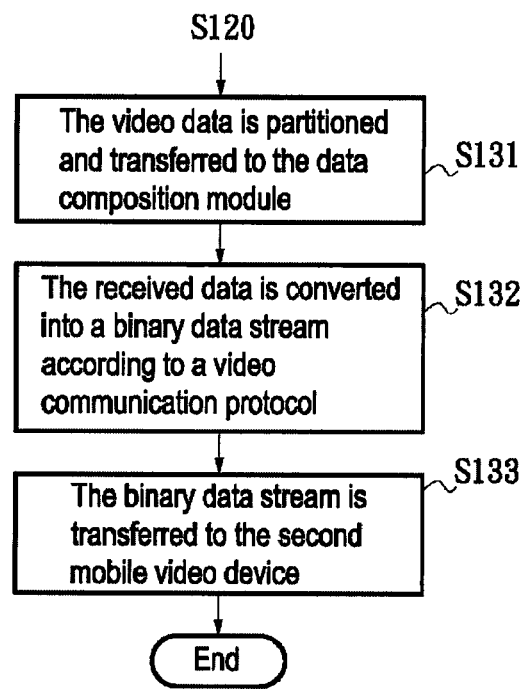
FIG. 3D is a flow chart for implementing Step S130 shown in FIG. 3A according to the present invention.

Then, the video data is transferred to the second mobile video device 20 according to a video communication protocol (Step S130). Referring to FIG. 3D, it shows the flow chart for implementing Step S130 shown in FIG. 3A according to the present invention. As described above, the first processor 12 partitions the video data and then transfers the partitioned video data to the data composition module (Step S131).

Then, the data composition module 13 continuously converts the received data to a binary data stream according to a video communication protocol (Step S132). The first wireless module 14 transfers the binary data stream to the second wireless module 24 of the second mobile video device 20 (Step S133).

As described above, the video communication protocol refers to H.223-multiplexing protocol for low bit rate multimedia communication, and the data composition module 13 converts the partitioned data of the video data into the binary data stream according to the data composition rules in the H.223-multiplexing protocol for low bit rate multimedia communication.

The data decomposition module 23 of the second mobile video device 20 uses the data decomposition rules in the H.223-multiplexing protocol for low bit rate multimedia communication to recover the binary data stream received by the second wireless module 24 into the video data.

The second processor 22 resolves and obtains the display picture data included in the video data, and the second screen 21 displays a second picture according to the display picture data. The displaying content of the second picture is substantially the same as that of the first picture. That is, the content displayed on the picture of the second screen 21 is the same as that on the operation picture of the first screen 11.

Figure 3E:
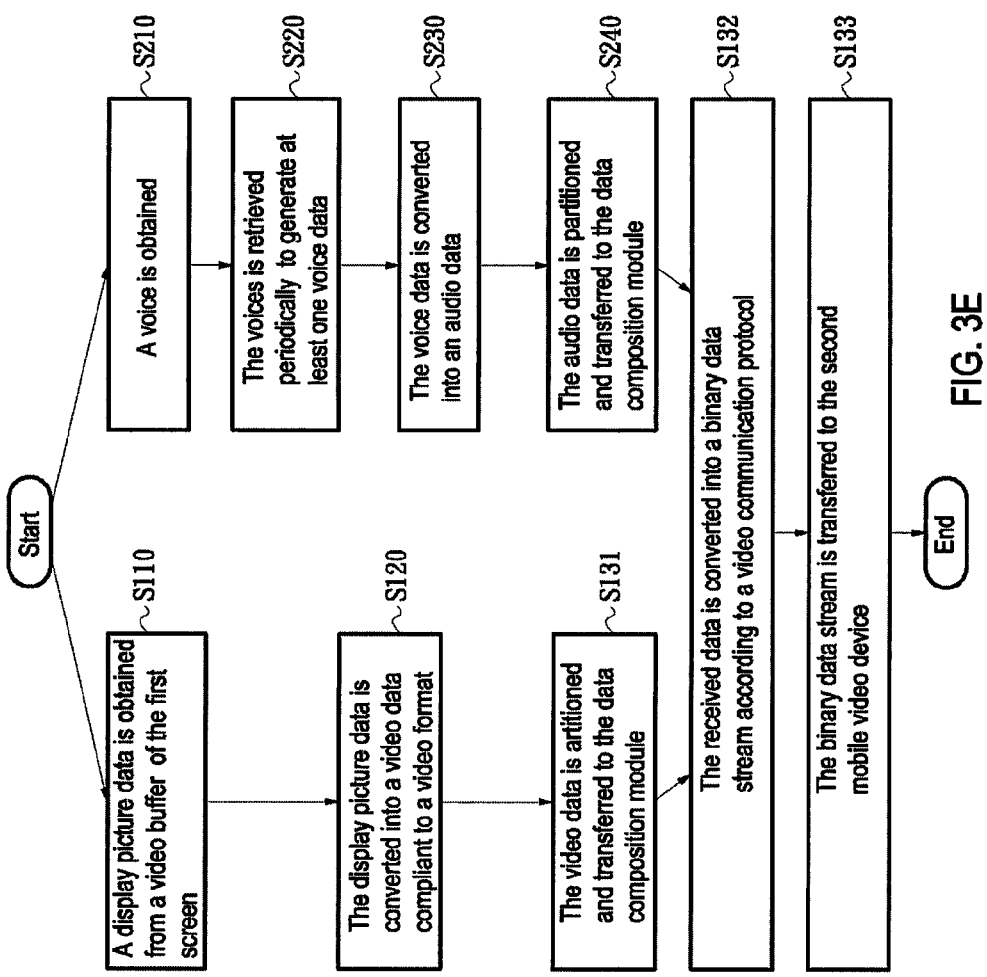
FIG. 3E is a flow chart of combining a voice transmission into the first embodiment of the present invention.

FIG. 3E is a flow chart of combining a voice transmission into the video transmission according to the first embodiment of the present invention. Referring to FIG. 3E, before Step S132, the microphone 16 of the first mobile video module 10 is used to obtain at least one voice (Step S210). The audio retrieving module 17 retrieves the voices obtained by the microphone 16 periodically, so as to generate more than one voice data (Step S220). The first processor 12 converts the voice data generated by the audio retrieving module 17 into an audio data according to a voice source conversion format, for example, a WB-AMR format, or an NB-AMR format (Step S230).

The first processor 12 partitions the audio data into a plurality of partitioned data, and transfers the partitioned data to the data composition module 13 (Step S240). The data composition module 13 continuously converts the received partitioned data (including partitioned video data and audio data) into the binary data stream described above according to a video communication protocol (Step S132). Then, the first wireless module 14 transmits the binary data stream to the second wireless module 24 (Step S133).

The data decomposition module 23 recovers the binary data stream received by the second wireless module 20 into the video data and the audio data according to the above video communication protocol (H.223-multiplexing protocol for low bit rate multimedia communication).

The second processor 22 obtains the display picture data and the voice data included in the recovered video data and audio data. The second processor 22 transfers the display picture data to the second screen, and transfers the voice data to the speaker 26 of the second mobile video device 20. The second screen 21 displays the second picture according to the display picture data transferred by the second processor 22, and the speaker 26 of the second mobile video device 20 plays the voice data transmitted by the second processor 22.

Figure 4A:
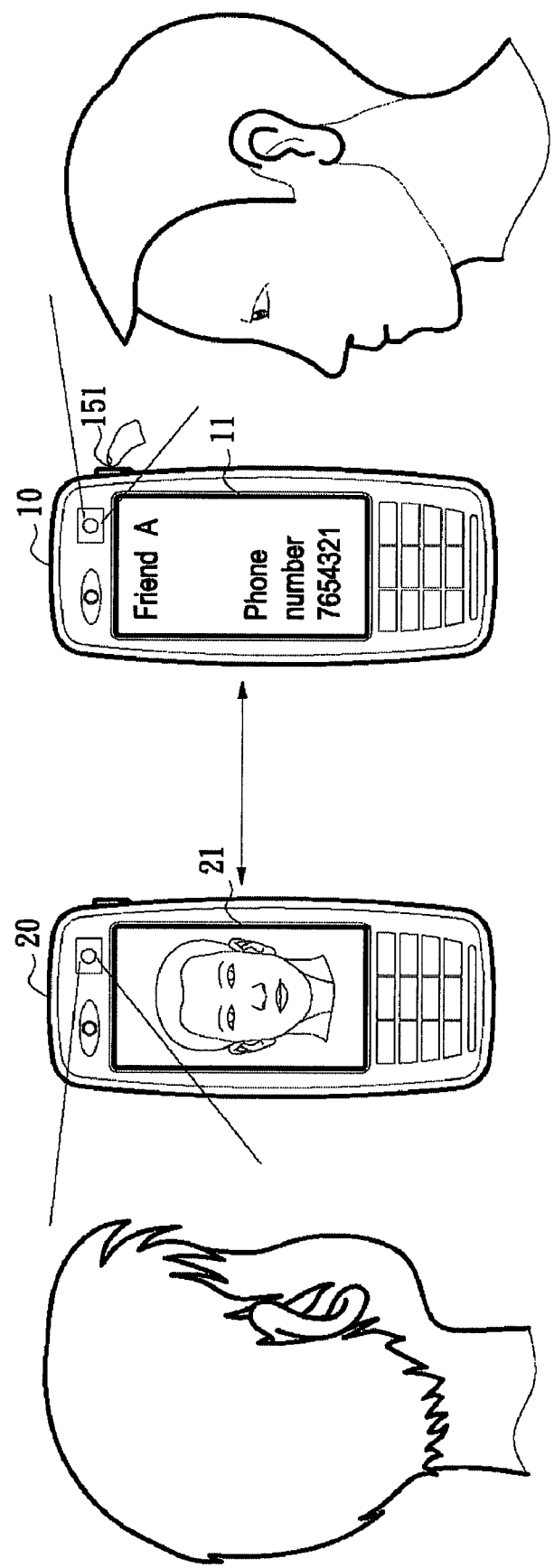
FIG. 4A is a schematic view showing that a first user uses the first mobile video device to query a data according to the present invention.
Figure 4B:
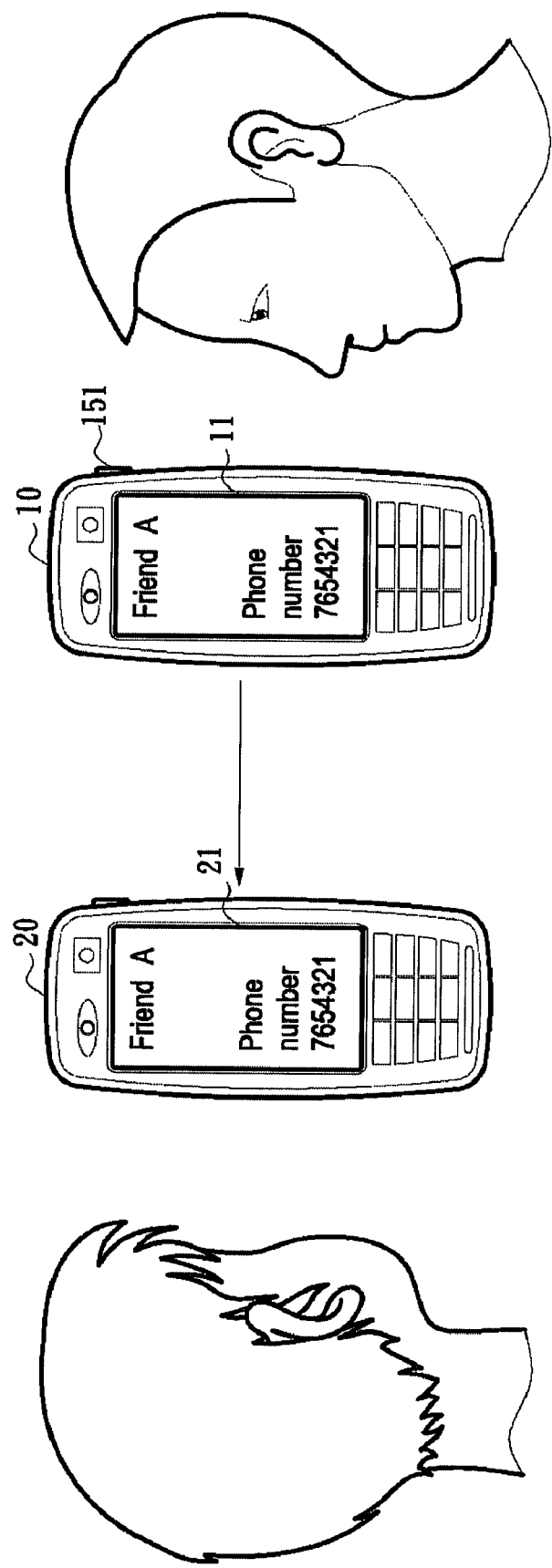
FIG. 4B is a schematic view showing that the first user uses the first mobile video device to transfer an operation picture according to the first embodiment of the present invention.

FIG. 4A is a schematic view showing that a first user uses the first mobile video device to query a data according to the present invention. FIG. 4B is schematic view of a scenario for the first mobile video device 10 to transmit the displaying content of the picture according to a first embodiment of the present invention. Referring to FIGS. 4A and 4B, a first user and a second user carry out a video conversation through the first mobile video device 10 and the second mobile video device 20. The second user inquires the first user about a phone number of a friend A. The first user presses a function key of the first mobile video device 10 to search for the phone number of the friend A. When the first user finds out the phone number of the friend A from the first mobile video device 10, the first mobile video device 10 displays a first picture (i.e., a man-machine operation picture of the first mobile video device). Then, the user presses the switching key 151 (i.e., the switching module 150 shown in FIG. 2), the first mobile video device 10 converts the display picture data into the video data and transmits the video data to the second mobile video device 20, and accordingly, the second mobile video device 20 displays a second picture. The displaying content of the second picture is substantially the same as that of the first picture, i.e., a picture showing the phone number of the friend A.

Figure 5:
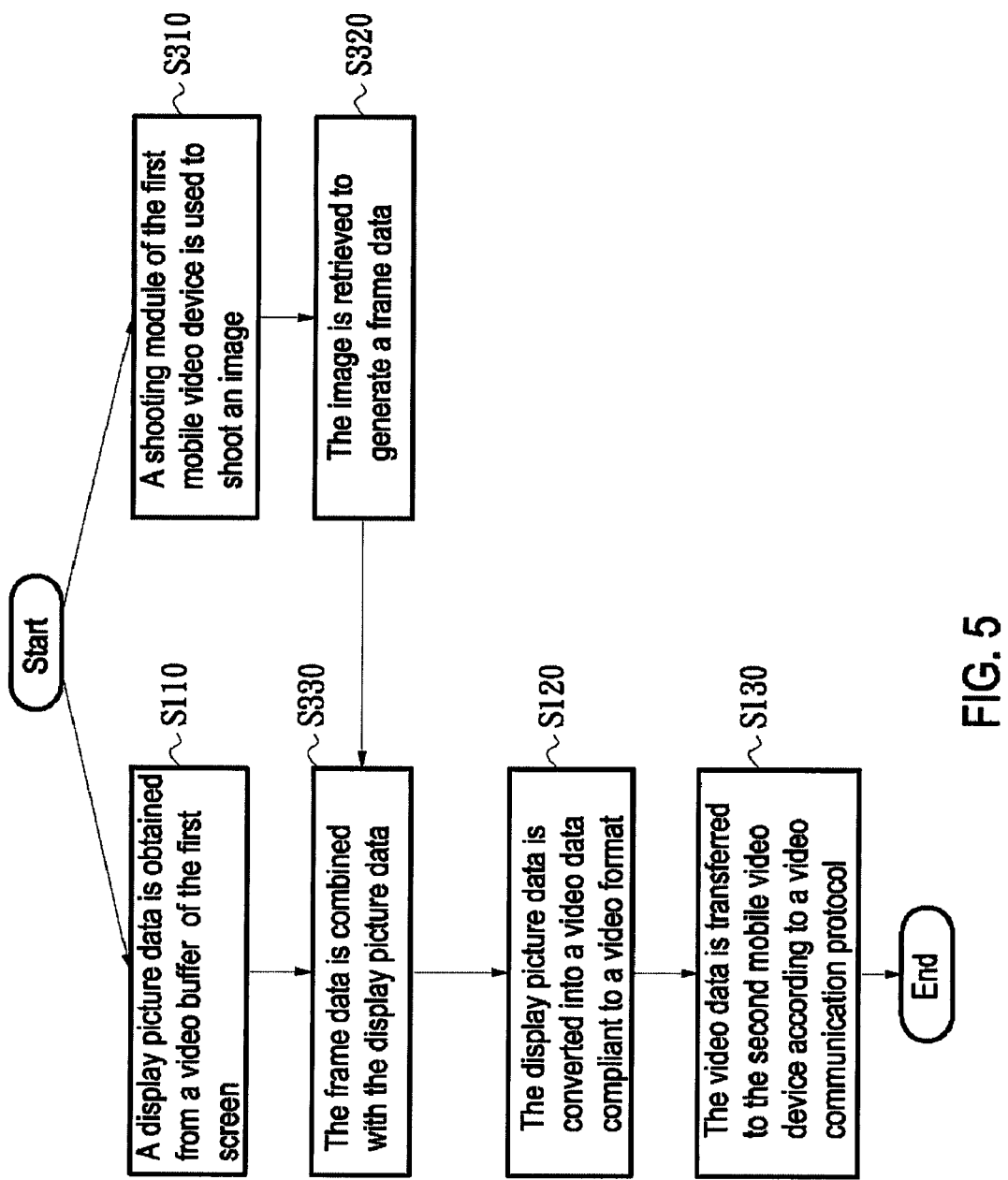
FIG. 5 is a flow chart of a method for transmitting a man-machine operation picture according to a second embodiment of the present invention.

FIG. 5 is a flow chart of a method for transmitting a man-machine operation picture according to a second embodiment of the present invention. Referring to FIG. 5, the difference from the flow chart in the first embodiment lies in that: when obtaining the display picture data, the first processor 12 can further obtain the frame data transferred by the frame retrieving module. The flow of the second embodiment is illustrated below.

First, an image is shot by using the shooting module 18 of the first mobile video device 10 (Step S310). When the user presses the switching key 151 of the first mobile video device 10, the shooting module 18 of the first mobile video device 10 maintains a state of shooting images.

Next, the image is retrieved to generate a frame data (Step S320). As described above, the frame retrieving module 19 retrieves the image periodically, so as to generate more than one frame data.

Then, the frame data is combined with the display picture data (Step S330). Besides obtaining the display picture data from the video buffer 111 of the first screen 11 periodically, the first processor 12 further maintains obtaining the frame data from the frame retrieving module 19. When obtaining the frame data and the display picture data, the first processor 12 combines the frame data with the display picture data.

It should be noted that, both the display picture data and the frame data are of a graphical data type. Therefore, the first processor 12 may combine the frame data with the display picture data by means of graphic combination, thereby enabling the display picture data to generate a picture-in-picture data or a picture-on-picture data.

Then, the first processor 12 converts the display picture data (picture-in-picture data or picture-on-picture data) into a video data compliant to the video format (H.263, H.264, or MPEG image compression manner). Particularly, the first processor 12 retrieves an RGB value from the display picture data (picture-in-picture data or picture-on-picture data), and converts the RGB value into the video data. The first processor 12 partitions the video data and the audio data into a plurality of partitioned data. Then, the data composition module 13 converts the partitioned data into a binary data stream, and transfers the binary data stream to the second wireless module 24 through the first wireless module 14.

The data decomposition module 23 of the second mobile video device 20 recovers the binary data stream received from the second wireless module 24 into the video data and the audio data. The second processor 22 obtains the display picture data and the voice data included in the video data and the audio data, transfers the display picture data to the second screen 21, and transfers the voice data to the speaker 26 of the second mobile video device 20. The second screen 21 displays a picture according to the frame data transmitted from the second processor 22, and the speaker 26 of the second mobile video device 20 plays the voice data transmitted from the second processor 22.

The difference between the second embodiment and the first embodiment lies in that, the display picture data obtained by the second processor 22 from the video data in the second embodiment is of a data type of the picture-in-picture data or picture-on-picture data.

Therefore, the second screen 21 displays a picture-in-picture or a picture-on-picture according to the picture-in-picture data or picture-on-picture data. That is, in the second picture displayed on the second screen 21, one portion of the displaying content on the picture is substantially the same as the displaying content of the first picture, and the other portion on the picture is the same as the image shot by the shooting module.

Figure 6A:
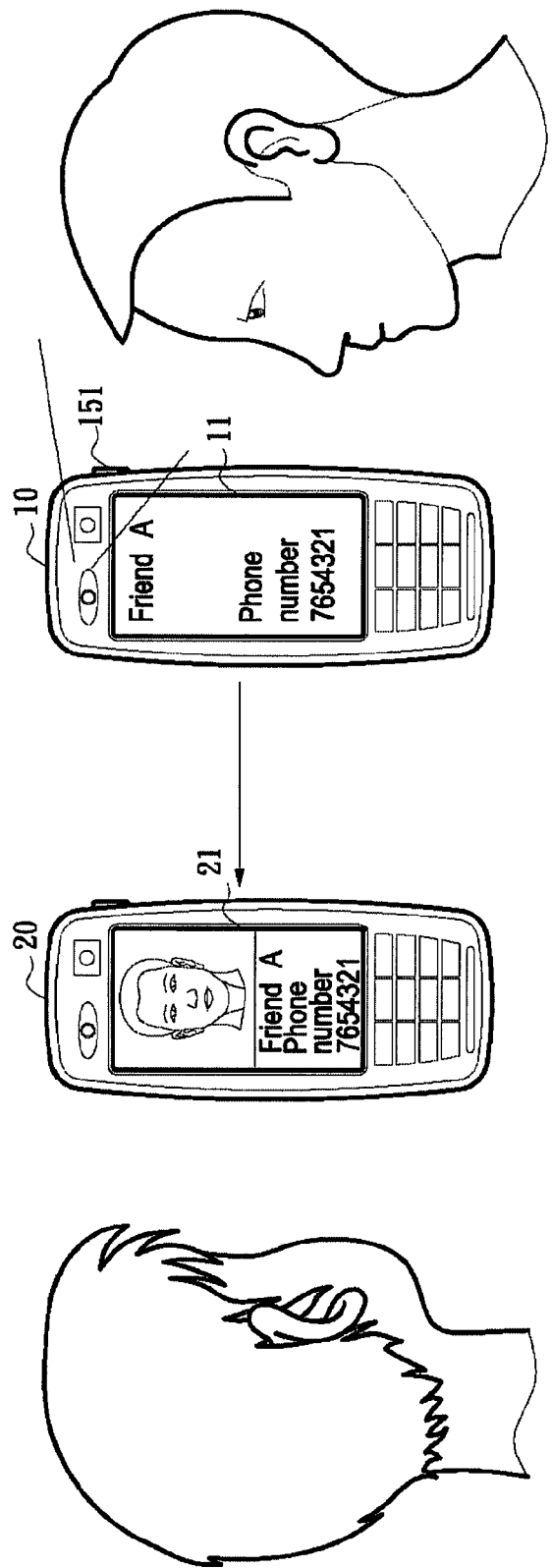
FIG. 6A is a schematic view of a second mobile video device that displays a picture-on-picture according to the second embodiment of the present invention.
Figure 6B:
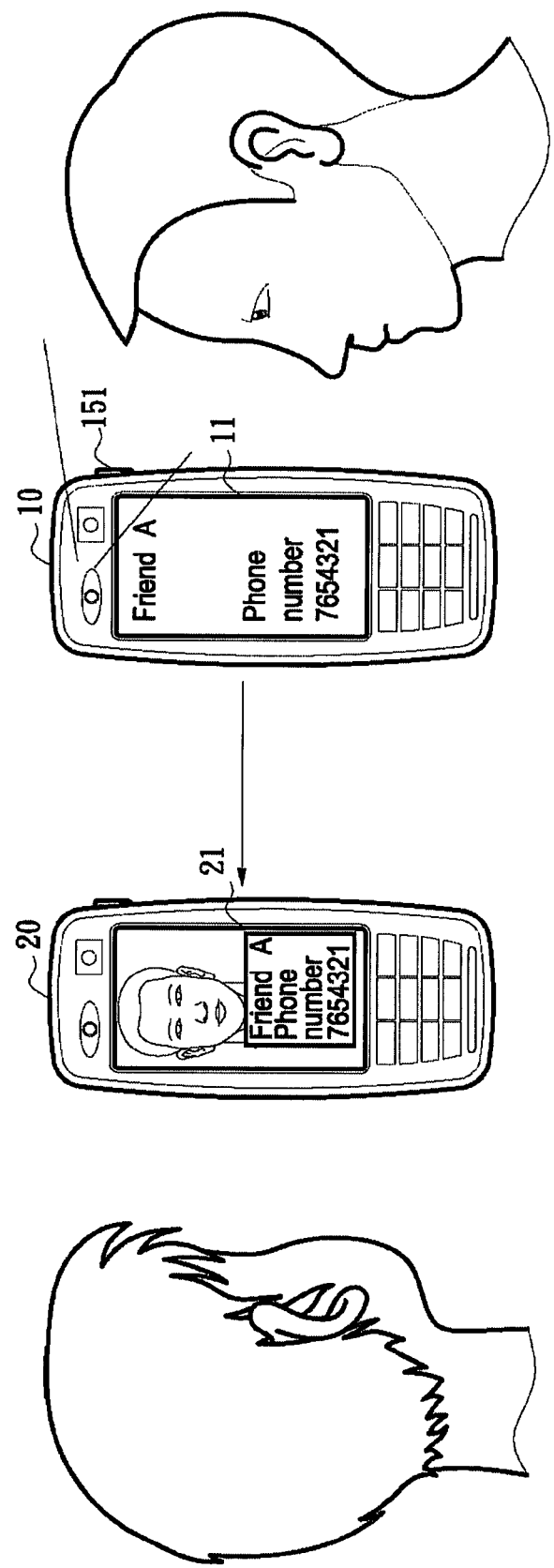
FIG. 6B is an example of the schematic view of the second mobile video device that displays a picture-in-picture according to the second embodiment of the present invention.
Figure 6C:
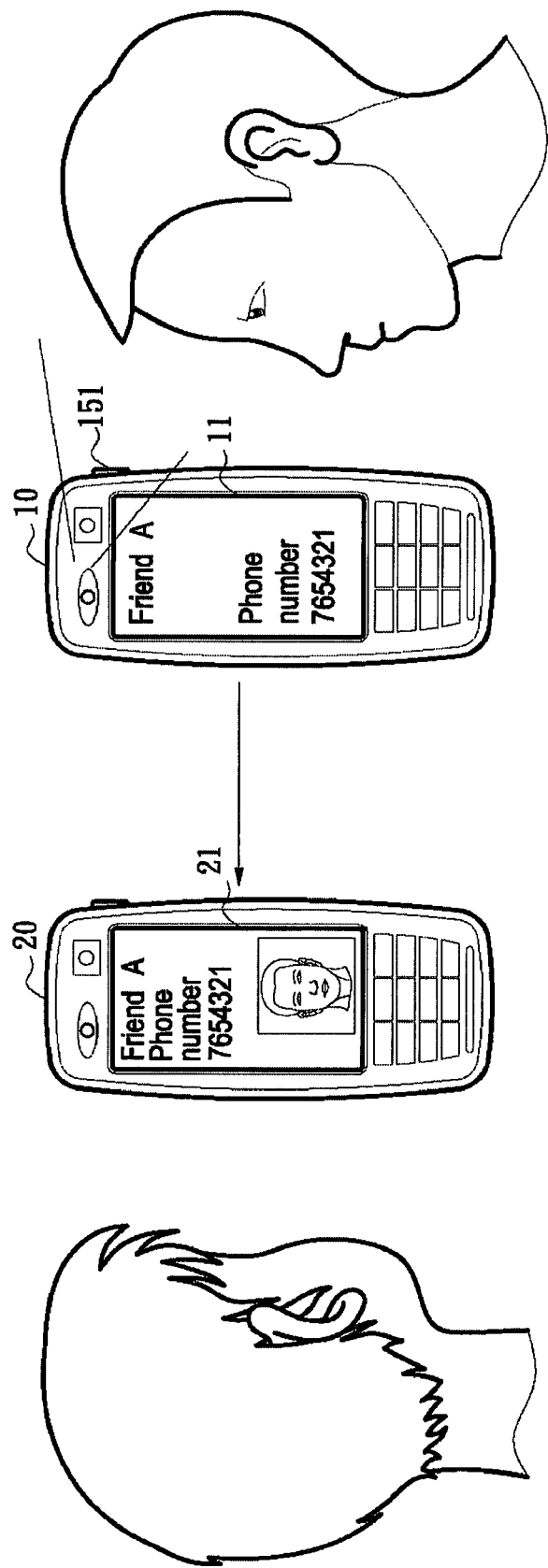
FIG. 6C is an example of the schematic view of the second mobile video device that displays the picture-in-picture according to the second embodiment of the present invention.

Referring to FIGS. 6A to 6C, they are schematic views of a scenario according to the second embodiment of the present invention. FIG. 6A is a schematic view of a scenario that the second mobile video device 20 displays a picture-on-picture according to the second embodiment of the present invention. FIG. 6B is an example of the schematic view of the second mobile video device 20 displays a picture-in-picture according to the second embodiment of the present invention. FIG.

6C is an example of the schematic view of the second mobile video device 20 displays the picture-in-picture according to the second embodiment of the present invention. The first user and the second user carry out a video conversation through the first mobile video device 10 and the second mobile video device 20. The second user inquires the first user about a phone number of a friend A, and the first user presses a function key (un-shown) of the first mobile video device 10 to search for the phone number of the friend A.

When the first user finds out the phone number of the friend A from the first mobile video device 10, the first mobile video device 10 displays a first picture (i.e., a man-machine operation picture of the first mobile video device 10).

When the first user presses a switching key (i.e., the switching module shown in FIG. 2), the first mobile video device 10 instructs the shooting module 18 to continuously shoot images, and the image retrieving module 19 keeps retrieving the images, so as to generate a frame data. However, the first processor 12 starts to obtain the display picture data from the video buffer 111 of the first screen 11 periodically, so as to keep obtaining the frame data and the display picture data.

The first processor 12 combines the frame data with the display picture data, thereby enabling the display picture data to generate a picture-in-picture data or a picture-on-picture data. The first processor 12 converts the display picture data (picture-in-picture data or picture-on-picture data) into a video data and transfers the video data to the second mobile video device 20. The second mobile video device 20 displays a second picture.

In this embodiment, the image shot by the shooting module is an image of the first user's head. The first picture is a picture showing the phone number of the friend A. Therefore, the displaying content of the second picture substantially includes the image of the first user's head and the displaying picture of the phone number of the friend A.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting a man-machine operation picture in a video system, applied to a first mobile video device and a second mobile video device wirelessly connected to each other, wherein the first mobile video device has a first screen, the method comprising:
   obtaining a display picture data from a video buffer of the first screen;
   displaying a first picture on a first screen according to the display picture data;
   converting the display picture data into a video data compliant to a video format;
   transferring the video data to the second mobile video device according to a video communication protocol; and
   displaying a second picture on a second screen of the second mobile video device, wherein a displaying content of the second picture substantially comprises a displaying content of the first picture.

2. The method according to claim 1, wherein the step of converting the display picture data into the video data compliant to the video format by the first mobile video device further comprises:
   obtaining a three primary color (RGB) value of the display picture data; and
   converting the RGB value into the video data compliant to the video format.

3. The method according to claim 2, wherein video format is a H.263 format, an H.264 format, or a MPEG format.

4. The method according to claim 2, wherein after the step of obtaining the RGB value of the display picture data, the method further comprises converting a chromaticity of the RGB value to perform a color gray processing on the RGB value.

5. The method according to claim 1, wherein the step of converting the display picture data into a video data compliant to the video format further comprises:
   obtaining a RGB value of the display picture data;
   converting the RGB value into a YUV value; and
   converting the YUV value into the video data compliant to the video format based on a data compression manner.

6. The method according to claim 5, wherein video format comprises a H.263 format, a H.264 format, or a MPEG format.

7. The method according to claim 5, wherein after the step of obtaining an RGB value of the display picture data, the method further comprises converting a chromaticity of the RGB value to perform a color gray processing on the RGB value.

8. The method according to claim 1, wherein before the step of converting the display picture data into a video data compliant to the video format, the method further comprises:
   utilizing a shooting module of the first mobile video device to shoot an image;
   retrieving the image to generate a frame data; and
   combining the frame data with the display picture data.

9. The method according to claim 8, wherein the display picture data combined with the frame data is formed into a picture-in-picture data or a picture-on-picture data.

10. The method according to claim 1, wherein the video communication protocol is a multiplexing protocol for low bit rate multimedia communication, and the video data is converted into a binary data stream according to the multiplexing protocol for low bit rate multimedia communication and transferred to the second mobile video device.

11. A mobile video device, capable of transmitting a man-machine operation picture, the mobile video device comprising:
   a first screen, comprising a video buffer, wherein the video buffer stores a display picture data and the first screen displays a first picture according to the display picture data;
   a processor, for obtaining the display picture data from the video buffer, and converting the display picture data into a video data compliant to a video format;
   a data composition module, for obtaining the video data provided by the processor, and converting the video data into a binary data stream according to a video communication protocol; and
   a wireless module, for outputting the binary data stream to at least another mobile video device and the at least another mobile video device comprises a second screen, the at least another mobile video device recovers the obtained binary data stream into the video data, and displays a second picture by the second screen according to the video data obtained after a recovering process, and a displaying content of the second picture substantially comprises a displaying content of the first picture.

12. The mobile video device according to claim 11, wherein the processor obtains a three primary color (RGB) value of the display picture data, and converts the RGB value based on a data compression manner for obtaining the video data compliant to the video format.

13. The mobile video device according to claim 12, wherein the video format is a H.263 format, a H.264 format, or a MPEG format.

14. The mobile video device according to claim 12, wherein the processor further converts a chromaticity of the RGB value to perform a color gray processing on the RGB value.

15. The mobile video device according to claim 12, wherein the processor further converts the RGB value into a YUV value and then converts the YUV value for obtaining the video data compliant to the video format.

16. The mobile video device according to claim 11, further comprising a shooting module and a frame retrieving module, wherein the shooting module is used to shoot an image, the frame retrieving module retrieves the image to generate a frame data, and the processor combines the frame data with the display picture data.

17. The mobile video device according to claim 11, wherein the display picture data combined with the frame data is a picture-in-picture data or a picture-on-picture data.

18. The mobile video device according to claim 11, wherein the video communication protocol is a multiplexing protocol for low bit rate multimedia communication.

19. The mobile video device according to claim 11, wherein the processor partitions the video data into a plurality of partitioned data, and the data composition module converts the partitioned data into the binary data stream according to a multiplexing protocol for low bit rate multimedia communication.

20. A video system, capable of transmitting a man-machine operation picture, comprising:
a first mobile video device, comprising:
a first screen, comprising a video buffer, wherein the video buffer stores a display picture data, and the first screen displays a first picture according to the display picture data;
a first processor, for obtaining the display picture data periodically, and converting the display picture data into a video data compliant to a video format;
a data composition module, for converting the video data into a binary data stream according to a video communication protocol; and
a first wireless module, for outputting the binary data stream; and
a second mobile video device, comprising:
a second wireless module, for receiving the binary data stream;
a data decomposition module, for converting the binary data stream into the video data according the video communication protocol;
a second processor, for obtaining the display picture data carried in the video data obtained after a converting process of the data decomposition module; and
a second screen, for displaying a second picture according to the display picture data obtained by the second processor, wherein the second picture substantially comprises the first picture.

21. The video system according to claim 20, wherein the first processor obtains a three primary color (RGB) value of the display picture data and converts the RGB value based on a data compression manner for obtaining the video data compliant to the video format.

22. The video system according to claim 21, wherein video format is a H.263 format, a H.264 format, or a MPEG format.

23. The video system according to claim 21, wherein the first processor further converts a chromaticity of the RGB value to perform a color gray processing on the RGB value.

24. The video system according to claim 21, wherein the first processor further converts the RGB value into a YUV value and then converts the YUV value for obtaining the video data compliant to the video format.

25. The video system according to claim 21, wherein the first mobile video device further comprises a shooting module and a frame retrieving module, the shooting module is used to shoot an image, the frame retrieving module retrieves the image to generate a frame data, and the first processor combines the frame data with the display picture data.

26. The video system according to claim 21, wherein the display picture data combined with the frame data is a picture-in-picture data or a picture-on-picture data.

27. The video system according to claim 21, wherein the first processor partitions the video data into a plurality of partitioned data, the data composition module converts the partitioned data into the binary data stream according to a multiplexing protocol for low bit rate multimedia communication, and the data decomposition module converts the binary data stream back into the video data according to the multiplexing protocol for low bit rate multimedia communication.

* * * * *